United States Patent [19]

Braun et al.

[11] 4,076,371
[45] Feb. 28, 1978

[54] HOLOGRAPHIC RECORDING MATERIAL FOR INFRARED RADIATION

[75] Inventors: Werner Braun, Munich; Gernot Decker; Horst Röhr, both of Garching, all of Germany

[73] Assignee: Max-Planck-Gesellschaft zur Forderung der Wissenschaften e.V., Gottingen, Germany

[21] Appl. No.: 713,832

[22] Filed: Aug. 12, 1976

Related U.S. Application Data

[62] Division of Ser. No. 484,698, Jul. 1, 1974, abandoned.

[30] Foreign Application Priority Data

Jul. 2, 1973 Germany .............................. 2333554

[51] Int. Cl.² .............................................. B05D 3/06
[52] U.S. Cl. .................................... 350/3.61; 250/316; 346/76 L; 346/77 E; 427/56; 428/435

[58] Field of Search ............. 346/1, 76 R, 76 L, 77 R, 346/77 E; 350/3.5; 250/316, 317, 318, 319; 427/55, 56

[56] References Cited

U.S. PATENT DOCUMENTS

| 3,475,760 | 10/1969 | Carlson | 346/1 |
| 3,617,274 | 11/1971 | Lin | 350/3.5 |
| 3,716,359 | 2/1973 | Sheridon | 350/3.5 |
| 3,787,873 | 1/1974 | Sato et al. | 346/135 |
| 3,869,301 | 3/1975 | Decker et al. | 427/56 |

*Primary Examiner*—John H. Newsome
*Attorney, Agent, or Firm*—Edwin E. Greigg

[57] ABSTRACT

A composite material for recording holograms with infrared radiation. The material includes a substrate and an IR-absorbing recording layer. Infrared radiation is absorbed by the recording layer whereupon the optical thickness of recording layer is changed in the areas exposed to infrared radiation.

3 Claims, 1 Drawing Figure

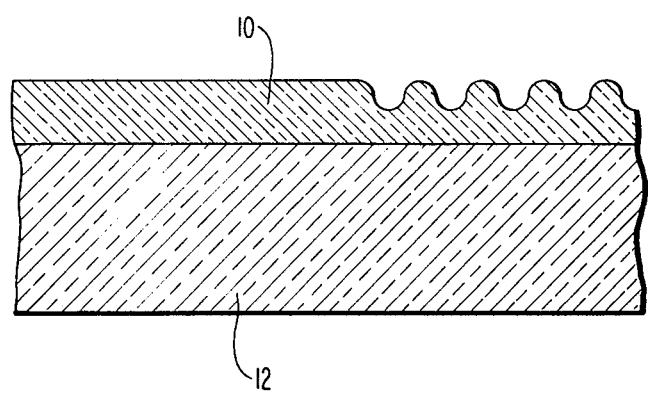

HOLOGRAPHIC RECORDING MATERIAL FOR INFRARED RADIATION

This is a division of application Ser. No. 484,698, filed July 1, 1974 now abandoned.

BACKGROUND OF THE INVENTION

The present invention relates to holographic recording, and more particularly to a holographic recording material for use with infrared radiation of a given wavelength, having a substrate and, disposed thereon, a layer whose optical thickness is changeable by the effects of infrared radiation.

The feasibility of storing holograms by vaporization of matter is known. See, for example, the article entitled "Thermally Engraved Gratings using a Giant-Pulse Laser" by Gerritsen and Heller, pages 2054–2056, in Vol. 38, of "Journal of Applied Physics" (April 1967).

It is known to produce holograms in thin bismuth layers by means of ruby laser light of appropriate power and a wavelength of 0.7 $\mu$m. The process is described in the article entitled "Holograms in Thin Bismuth Films" by Amodei and Mezrich, appearing on pages 45–46, in Vol. 15, of "Applied Physics Letters" (July 1969). In that process, a spatial resolution of 1000 lines/mm is said to be achievable.

However, when the known bismuth layers are used in the infrared region of the spectrum, the achievable linearity of the recordings is unsatisfactory, because the metal layer is completely vaporized in the exposed areas, giving the recordings very abrupt contrast gradations. Furthermore, the fabrication of thin bismuth layers is complicated.

With a view to avoid these disadvantages, it had been proposed to use a holographic recording material for infrared radiation including a layer which is vaporizable by the heat energy due to the infrared radiation, but which is itself relatively transparent to the incident IR radiation, and which is disposed on a highly absorbing substrate (U.S. patent application Ser. No. 368,987).

OBJECT AND SUMMARY OF THE INVENTION

It is an object of the present invention to describe a holographic recording material which permits the simple production of holographic recordings, which exhibits good linearity and which is especially suitable for use with infrared radiation of a wavelength of approximately 3 $\mu$m.

These and other objects are achieved, according to the invention, by a holographic recording material which is characterized in that the surface layer consists of a material that is highly absorbent of infrared radiation of the given wavelength and in that it is thicker than the change in the optical thickness caused by the irradiation or than any part of the layer which is appreciably affected by the radiation.

The absorption of infrared radiation takes place in the surface layer itself and not in the substrate, as was the case in the recording material proposed in U.S. patent application Ser. No. 368,987.

The material, according to the present invention, has the advantage that holograms may be recorded in a layer which, within certain limits, can be of arbitrary thickness, and which can, therefore, be easily deposited on the substrate. The recording does not exhibit excessively abrupt contrast gradation (it has linear contrast), and this property can be important, for example, for making multiple exposures.

For use with radiation of 3 $\mu$m wavelength, such as is produced by hydrogen fluoride lasers, layers made of gelatin have been found to be particularly advantageous.

BRIEF DESCRIPTION OF THE DRAWING

The present invention will be better understood, and further objects and advantages will become more apparent, from the ensuing detailed specification of a preferred, although exemplary, embodiment of the invention taken in conjunction with the sole FIGURE which illustrates in cross section a portion of a holographic recording material as a composite structure including a substrate and a surface layer.

DESCRIPTION OF THE PREFERRED EMBODIMENT

The holographic recording material shown in the FIGURE consists essentially of a layer of gelatin 10 disposed on a substrate plate 12. The gelatin layer can be relatively thick; for example, it can have a thickness of more than 2 mm, but a range of thickness of approximately 0.1 mm to 1.0 mm is preferred. The layer consists preferably of pure gelatin.

Although it is not necessary to do so, it is advantageous to deposit the gelatin layer 10 on a glass plate, because a substrate transparent to visible light permits reconstructing the infrared hologram more easily with visible light than would be the case with a substrate opaque to visible light.

During the exposure of the absorbing gelatin layer to infrared radiation of 3 $\mu$m wavelength, the optical thickness of the exposed regions of the layer is changed with linear contrast (probably by absorption in OH-ions of the layer), and this process is indicated schematically by the sinuous curve in the right-hand portion of the drawing. In actual experiments, the recording material described here has proved to be well suited for the satisfactory recording of phase-holograms made by utilizing a hydrogen fluoride laser ($\lambda$ = 3 $\mu$m) with a power density in the region of a few MW/cm$^2$ and a pulse duration of approximately 200 ns. The recording material, according to the present invention, is especially suitable for use in interferometric measurements on plasmas contained in quartz vessels without the need for additional windows, particularly in torus-shaped vessels, or for so-called "side-on" observations on linear installations. The described recording material is also suitable for use in testing industrial materials. The above mentioned region of power density may be from 1 to 5 MW/cm$^2$.

What is claimed is:

1. A method for recording holograms, comprising the steps of:
   providing a substrate:
   providing on said substrate a single layer, said layer consisting of substantially pure gelatin capable of absorbing infrared radiation and having a thickness which is greater than the change in thickness caused by the contemplated exposure to the infrared radiation;
   generating a holographic pattern using infrared laser radiation; and
   exposing the layer to the holographic patterned infrared laser radiation to cause changes in the optical thickness thereof.

2. The method according to claim 1, wherein the step of providing a substrate comprises providing a transparent substrate.

3. The method according to claim 2, wherein the step of providing a substrate comprises providing a glass substrate.

* * * * *